(12) United States Patent
Debus et al.

(10) Patent No.: US 6,616,233 B1
(45) Date of Patent: Sep. 9, 2003

(54) SLIDE RAIL FOR VEHICLE SEAT AND SEAT COMPRISING SUCH A SLIDE RAIL

(75) Inventors: Yoann Debus, Flers (FR); Hervé Calor, Messei (FR)

(73) Assignee: Bertrand Faure Equipment SA, Boulogne (FR)

( * ) Notice: Subject to any disclaimer, the term of this patent is extended or adjusted under 35 U.S.C. 154(b) by 0 days.

(21) Appl. No.: 09/627,826

(22) Filed: Jul. 28, 2000

(30) Foreign Application Priority Data

Aug. 2, 1999 (FR) .......................................... 99 10022

(51) Int. Cl.⁷ ................................................ B60N 2/00
(52) U.S. Cl. ...................... 297/341; 297/344.1; 248/429
(58) Field of Search ....................... 248/429; 297/344.1, 297/341

(56) References Cited

U.S. PATENT DOCUMENTS 5,605,377 A * 2/1997 Tame ......................... 297/341
5,717,300 A * 2/1998 Baloche et al. ............. 318/282
5,820,216 A * 10/1998 Feuillet ....................... 297/341
5,855,413 A * 1/1999 Couasnon et al. .......... 297/341
5,927,809 A * 7/1999 Tame .......................... 297/341
6,036,267 A * 3/2000 Downey et al. ............. 297/341

FOREIGN PATENT DOCUMENTS

FR    2 430 330    7/1978
FR    2 746 354    9/1997

\* cited by examiner

*Primary Examiner*—Peter M. Cuomo
*Assistant Examiner*—Stephanie Harris
(74) *Attorney, Agent, or Firm*—Marshall, Gerstein & Borun

(57) ABSTRACT

Slide rail for vehicle seat comprising two profiles, a latch and an unlocking device moveable into an active position to hold the latch in the unlocked position in order to allow the seat to slide forward, this unlocking device being then held in its active position by a pivoting hook. On this hook is mounted a pivoting actuator finger designed to retract elastically without causing the hook to pivot when it passes over a fixed stop when the seat slides forward, and to pivot in the opposite direction by releasing the hook when it meets the stop during a rearward movement of the seat.

10 Claims, 4 Drawing Sheets

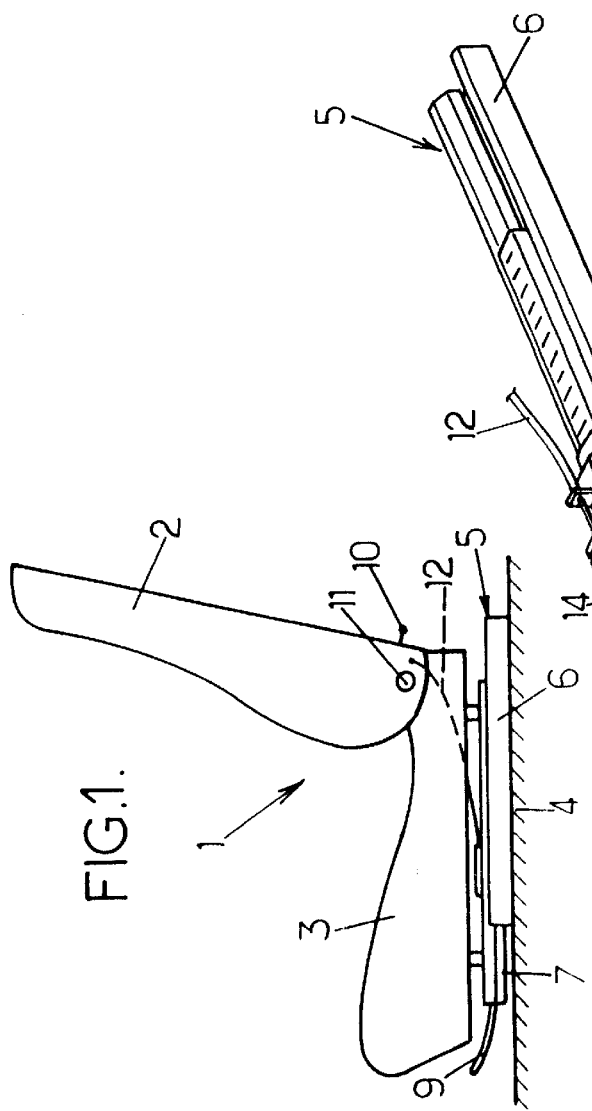
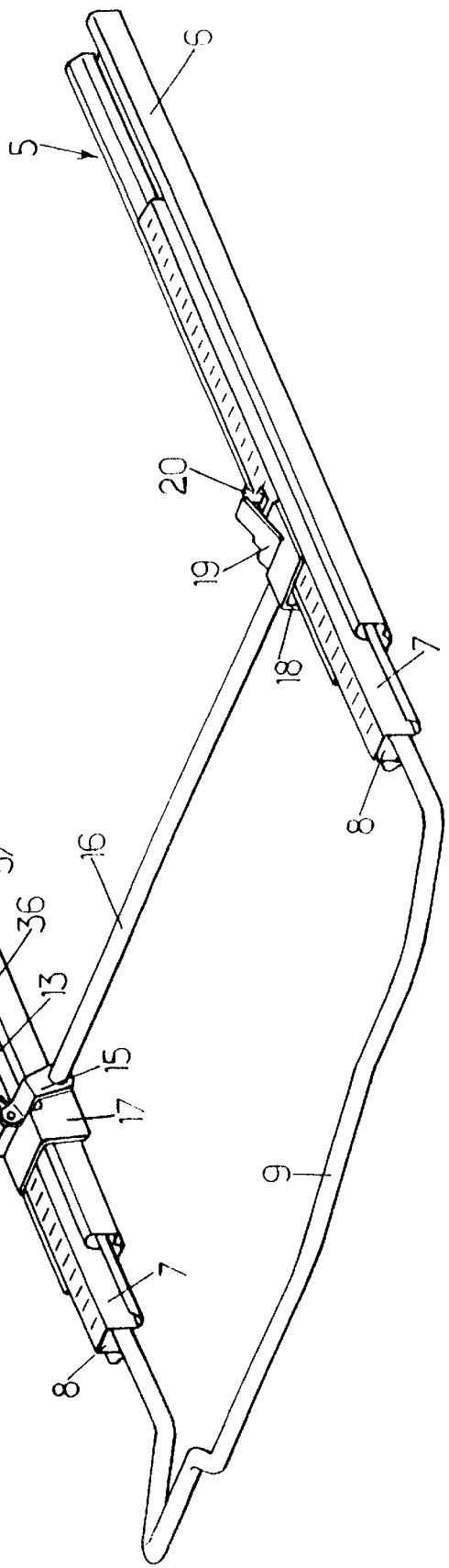

SLIDE RAIL FOR VEHICLE SEAT AND SEAT COMPRISING SUCH A SLIDE RAIL

FIELD OF THE INVENTION

The present invention relates to slide rails for vehicle seats and seats comprising such slide rails.

More particularly, the invention concerns a slide rail for a vehicle seat comprising:

first and second profiles intended to be attached one to the vehicle and the other to the seat, the first and second profiles being mounted in sliding relation to one another in a longitudinal direction in opposite first and second sliding directions corresponding respectively to movements of the seat forwards and rearwards, a latch mounted on the second profile and moveable between firstly a locked position where said latch blocks the second profile in relation to the first profile, and secondly an unlocked position where said latch allows relative sliding between the first and second profiles, the latch being elastically biased towards its locked position, first control means for moving the latch from its locked position to its unlocked position without blocking said latch in the unlocked position in order to adjust the seat position, an unlocking device which is movable on the second profile between firstly a rest position where said unlocking device does not interfere with the latch and secondly an active position where said unlocking device places the latch in the unlocked position, the unlocking device being elastically biased towards its rest position and comprising retention means for holding said unlocking device in its active position when it has been placed in said active position, and the unlocking device also comprising an actuator finger designed to co-operate with at least one stop attached to said first profile to release the unlocking device, enabling it to return to its rest position when said unlocking device is in its active position and the first and second profiles move in relation to one another for the second sliding direction, and second control means for moving the unlocking device from its rest position to its active position.

Slide rails of this types are used in particular to equip the front seats of two-door vehicles. To gain access to the rear seats of such a vehicle, the second means of control are actuated, generally by folding the seat back forward, then sliding the seat forward to a stop position. To return to its initial position, the seat is then slid back to a fixed position determined by the stop attached to the first profile: once arrived at this fixed position, the seat locks again in relation to the vehicle floor.

BACKGROUND OF THE INVENTION

Document FR-A-2 746 354 describes an example of such a slide rail in which the stop consists of a spring rod attached to the first profile and designed to:

retract below the actuator finger of the unlocking device when the seat is moved forward, and interfere with this actuator finger, forcing it to pivot to release the unlocking device, when the seat is moved to the back after having been slid forward.

The slide rail shown in this document generally gives satisfaction but nonetheless has the drawback that the spring rod constituting the stop is a relatively fragile piece which risks being damaged in particular due to external action and/or inappropriate action of the slide rail. In this case the function of the slide rail is deteriorated and its proper relocking is no longer guaranteed when the seat has been slid back after having been moved forward to gain access to the rear seats of the vehicle.

OBJECTS AND SUMMARY OF THE INVENTION

The purpose of the present invention is therefore to remedy these drawbacks.

To this end, according to the invention, a slide rail of the type concerned is characterized:

in that the retention means of the unlocking device comprise a hook element mounted pivotally on said unlocking device about a first transverse axis perpendicular to the longitudinal direction, said hook element being elastically biased in a first angular direction towards an engagement position where said hook element is able to co-operate, when the unlocking device is in its active position, with a complementary element fixedly attached to the second profile, in that said hook element is movable in a second angular direction opposite the first angular direction from its first engagement position to a retracted position where said hook element does not co-operate with the complementary element, in that the actuator finger is mounted pivoting on the hook element about a second transverse axis parallel to the first transverse axis, the actuator finger being elastically biased in the second angular direction towards an active position where said actuator finger is positioned to interfere with the stop of the first profile, the hook element co-operating with the actuator finger to allow only a pivoting of the actuator finger in the first angular direction from the active position of said actuator finger, in that the first and second angular directions are selected so that the stop of the second profile biases the actuator finger in the second angular direction when said actuator finger is in the active position and meets said stop of the first profile while the first and second profiles move in relation to each other in the second sliding direction, the actuator finger then driving the hook element in the first angular direction up to its retracted position, and in that the stop of the first profile is designed to co-operate with the actuator finger by a cam effect by moving said actuator finger in the first angular direction from its active position in relation to the hook element when said actuator finger meets said stop of the first profile, being in its active position, while the first and second profiles move in relation to each other in the first sliding direction so that said actuator finger can then pass beyond the stop of the first profile.

Thanks to these arrangements it is no longer necessary to rely on the flexibility of the stop, so that a more solid stop can be used than the simple spring blade of the prior art.

In preferred embodiments of the invention, where applicable also one and/or the other of the following arrangements may be used:

the stop of the first profile is rigid;

the first profile has approximately a U-shaped section with a horizontal web and two vertical side wings, the stop being constituted by a stamping arranged locally in the web of the first profile, the unlocking device comprises a traveler which is slidingly mounted in the longitudinal direction on the second profile between positions corresponding to the rest and active positions of the unlocking device, the hook element being mounted pivoting on this traveler and said traveler co-operating by cam effect with a control finger linked to the latch in order to move said latch into its unlocked position when the unlocking device is in its active position, the latch is an elastic metal part contained in an inner hollow space delimited by the first and second profiles, said latch comprising a free folded end forming said control finger, the second profile has approximately a U-shaped cross-section with a horizontal web and two vertical side wings, the traveler being mounted on the web of the second profile outside the slide rail, said traveler being linked to the hook element through a longitudinal slot arranged in the web of the second profile, the hook element and the actuator finger being located in an inner hollow space delimited by the first and second profiles and being linked to the traveler through a longitudinal slot arranged in the web of the second profile, said longitudinal slot being also traversed by the control finger of the latch, the hook element comprises a free end bearing a hook which projects towards the web of the second profile and which is designed to penetrate into a recess belonging to said web of the second profile, said hook being in the slot of the web of the second profile when the unlocking device is in the rest position, and said free end of the hook element having an inclined cam surface which is designed to co-operate with the web of the second profile at one of the slot of said web, repelling the hook element to its retracted position when the unlocking device is moved from its rest position to its active position, the unlocking device comprises a spring with a hook branch which is linked to the actuator finger and which penetrates into an arc-shaped slot arranged in the hook element, said arc-shaped slot being centered on the second transverse axis and being arranged to allow the actuator finger to move in the first angular direction in relation to the hook element from the active position of said actuator finger, said hook branch exerting on the actuator finger and hook element a force oriented along a line passing between the first and second transverse axes so as to bias the hook element in a first angular direction and the actuator finger in the second angular direction.

Another object of the invention is a vehicle seat comprising a seat base slidingly mounted longitudinally by at least one slide rail as defined above.

Finally, another object of the invention is a vehicle seat comprising a seat base mounted sliding longitudinally by a first slide rail as defined above and a second slide rail also comprising first and second profiles and a latch moveable between locked and unlocked positions, the seat base being fixed to the second profiles of the slide rails, the traveler of the first slide rail being linked by means of a connecting rod to a transverse link bar pivotally mounted on the second profiles of the two slide rails and which comprises a support flange co-operating with the latch of the second slide rail to move said latch of the second slide rail into its unlocked position on actuation of the second control means.

BRIEF DESCRIPTION OF THE DRAWINGS

Other characteristics and advantages of the invention will appear during the description below of one of its embodiments given as a non-limitative example, in view of the attached drawings.

On the drawings:

FIG. 1 is a diagrammatic view of a vehicle seat fitted with two slide rails, one slide rail of which corresponds to an embodiment of the invention, FIG. 2 is a perspective view showing the slide rails of the seat in FIG. 1.

MORE DETAILED DESCRIPTION OF THE DRAWINGS

Figure 3:
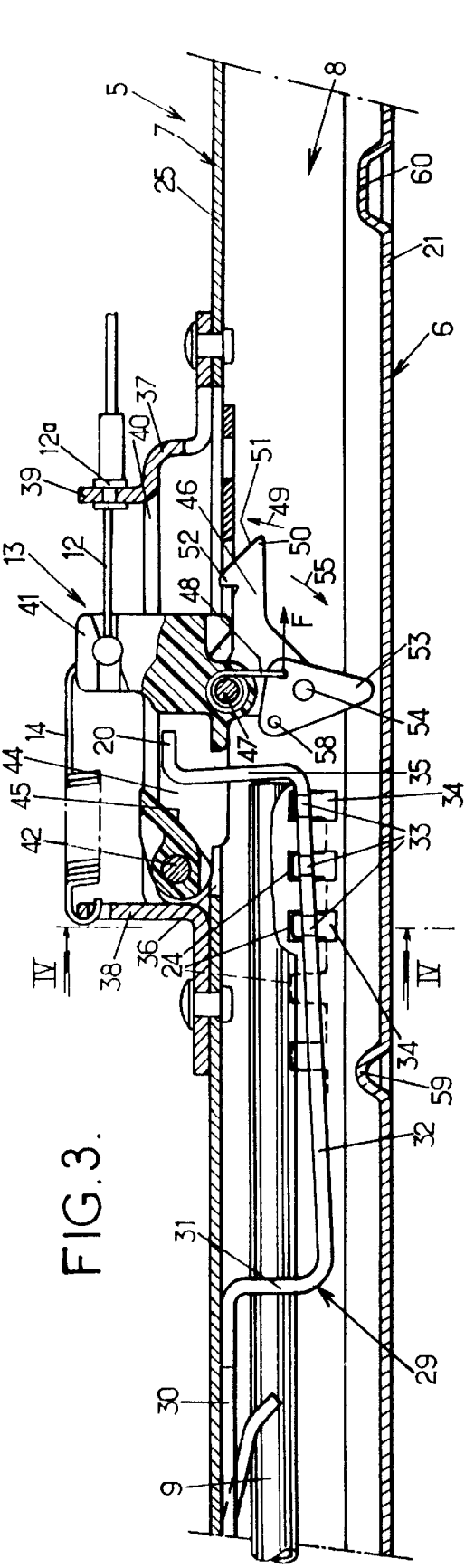
FIG. 3 is a longitudinal cross-section of one of the slide rails in FIG. 2 in rest position.

On the various figures the same references designate identical or similar elements.

FIG. 1 shows a seat 1, in particular a front seat of a vehicle, which comprises a seat back 2 mounted pivoting on a seat base 3, itself attached to the floor 4 of the vehicle via two parallel slide rails 5, each of which extend in a longitudinal direction allowing movement of the assembly of seat 1 towards the front and rear.

Each slide rail 5 comprises firstly a fixed profile 6 attached to the floor 4 of the vehicle and secondly a mobile profile 7 attached to the seat base 3 and mounted sliding on the fixed profile parallel to said longitudinal direction.

The fixed and mobile profiles 6, 7 of each slide rail delimit between them an inner hollow space 8 (see FIG. 2) in which is housed a slide rail latch to be described in more detail below and which is normally in its locked position where it blocks the mobile profile 7 of the corresponding slide rail.

The latches of the two slide rails 5 can be unlocked simultaneously when the passenger in the seat 1 raises a generally U-shaped control bracket 9, the base of which is located below the front edge of the seat and the arms of which penetrate into the inner hollow spaces 8 of the two slide rails 5 to meet the corresponding slide rail latches.

To adjust the longitudinal position of the seat, the control bracket 9 is actuated which unlocks the latches of the two slide rails 5 and allows the sliding of the mobile profiles 7 on these two slide rails.

When a user wishes to gain access to or leave the rear seats of this vehicle, he actuates for example a lever 10 (FIG. 1) or other control element which releases the seat back 2 to rotate about a transverse horizontal pivoting axis 11. The seat back 2 then pivots forward generally automatically under the action of an internal spring in said seat back (not shown) into a folded position.

This pivoting movement of the seat back 2 creates tension on the sheathed cable 12 which then pulls towards the back a traveler 13 (FIG. 2) which is mounted sliding in the longitudinal direction on the mobile profile 7 of one of the slide rails 5, this traveler 13 being normally held in a front position by a return spring 14.

As will be explained below, the movement of the traveler 13 to its rear position causes an unlocking of the latch of the slide rail 5 which contains the traveler, and said traveler remains then blocked in the active position. The traveler 13 then also causes to pivot a connecting rod 15 which is attached to a transverse horizontal link bar 16, the ends of which are mounted pivoting on flanges 17, 18 attached respectively to the mobile profiles 7 of the two slide rails.

The end of the link bar 16 which is located near the slide rail 5 not containing the traveler 13 is attached to a lever 19 which extends to the rear and is designed to pivot, coming to rest on the rear end 20 of the latch of the corresponding slide rail when the traveler 13 is moved to its rear position.

Thus when the seat back 2 is folded forward, the latches of the two slide rails are unlocked and the seat 3 can be moved forward to a maximum. When the user of the seat then moves the seat back to resume its usage position, this seat stops automatically in its initial position i.e. in the last longitudinal position set by said user.

The means which achieve this result will be now be described in more detail in view of FIGS. 3 to 5 which show a particular embodiment of the invention.

Figure 4:
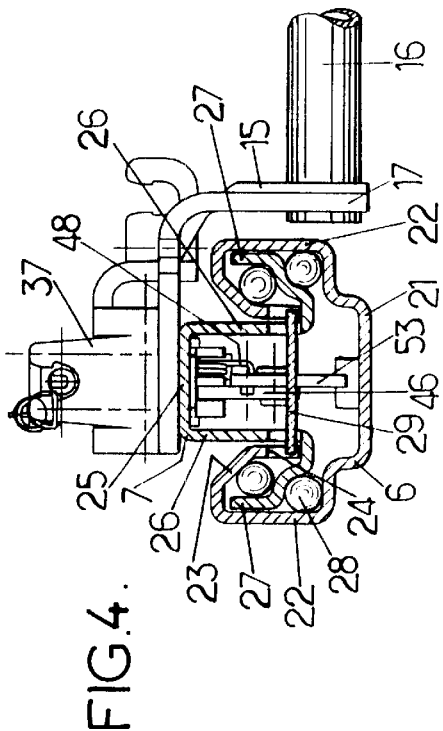
FIG. 4 is a cross-section view along line IV—IV of FIG. 3.

In this example as can be seen on FIG. 4, the fixed profile 6 of each of the two slide rails has a U-shaped section open at the top with a horizontal base 21 and two vertical wings 22 which extend downward and inward by two returning lips 23 which extend to a lower edge, forming notches 24 oriented downward.

Also the mobile profile 7 of each of the two slide rails has a U-shaped cross-section open at the base which comprises a horizontal upper web 25 and two vertical wings 26 arranged between the returning lips 23 of the fixed profile. The lower ends of said vertical wings 26 extend upward and outwards by two external returning lips,27 which extend into the returning lips 23 of the fixed profile, balls 28 being generally interposed between the fixed and mobile profiles respectively above and below each external lip 27.

As can be seen in particular on FIG. 3, the latch 29 of each slide rail takes the form of a folded and cut metal spring rod extending in the longitudinal direction.

This latch 29 has a front end 30 which is fixed below the upper web 25 of the mobile profile by welding, riveting or other method, and which extends forward by a projection 31 extending approximately vertically downward, then by a rear part 32 slightly angled in relation to the horizontal.

This rear part 32 can be moved vertically by flexion of the latch 29 and towards its rear end has side teeth 33 which extend in the transverse horizontal direction and which in the locking position penetrate into the notches 24 of the fixed profile, passing through windows 34 arranged in the vertical wings 26 of the mobile profile.

Finally the rear end of the slide rail latch 29 has a projection 35 which extends upward to the support flange 20 already mentioned for slide rail 5 not containing the traveler 13.

The projection 31 of each latch 29 is traversed by one of the arms of the control bracket 9, the end of this arm coming to rest on the part 32 of the latch to move this down when the front part of said bracket 9 is raised.

Also more particularly for slide rail 5 which contains traveler 13, the upper web 25 of the mobile profile of this slide rail comprises a cut-out 36 in the form of a longitudinal slot in which slides the traveler 13.

Above this cut-out is attached a metal support part 37 which covers said cut-out 36 and the traveler 13.

This support part 37 comprises at its front and rear ends respectively a front lug 38 to which is attached one of the ends of the return spring 14 and a rear lug 39 to which is attached one of the ends 12*a* of the sheath of sheathed cable 12.

The support piece 37 also comprises a longitudinal cut-out 40 in which slides a head 41 of traveler 13 which projects upward from the rear end of said traveler and which is attached both to an end of return spring 14 and to an end of sheathed cable 12.

Figure 5:
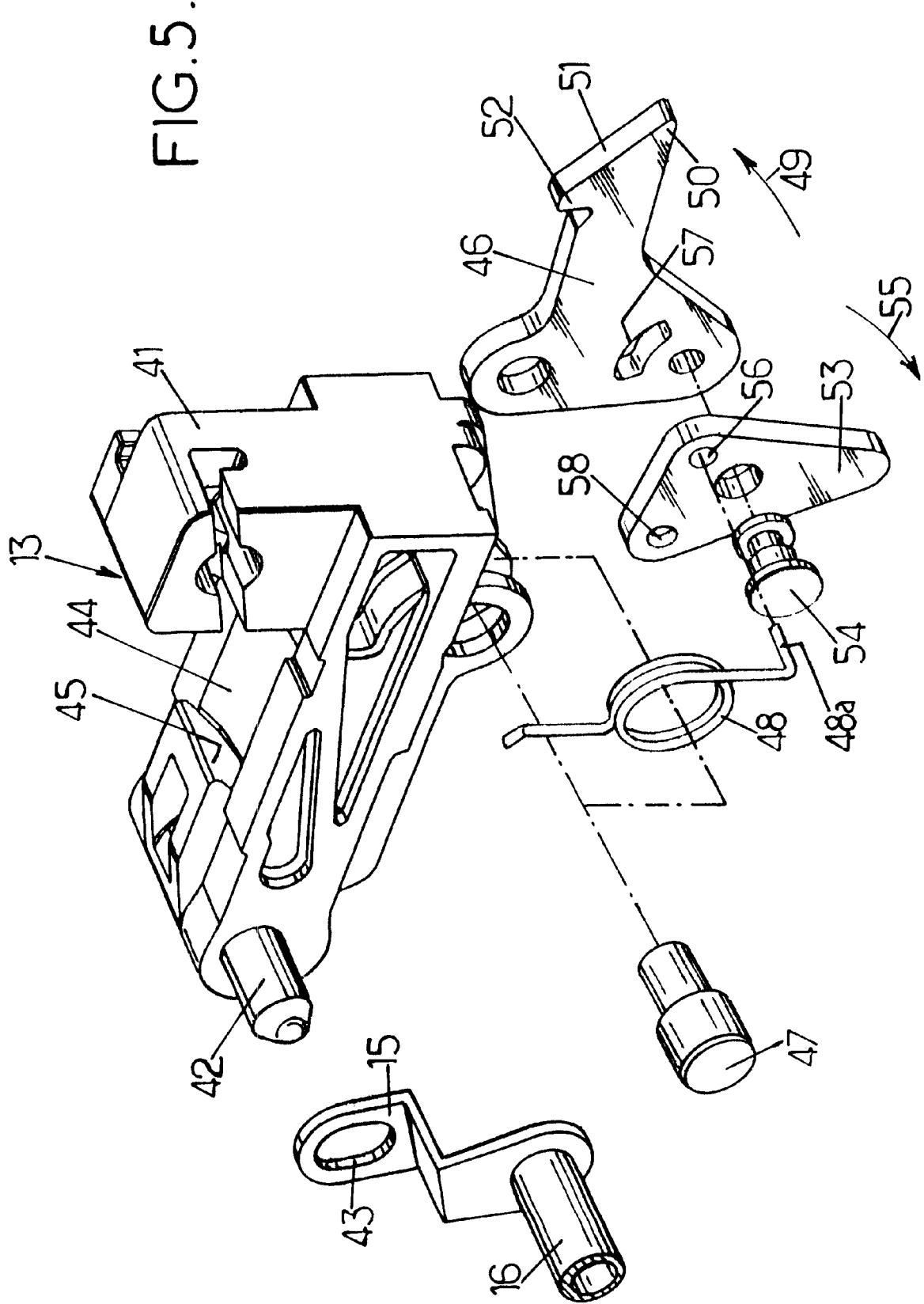
FIG. 5 is a partially exploded view of the slide rail in FIGS. 3 and 4 showing the unlocking device of this slide rail.

Also as can be seen from FIG. 5, the front end of traveler 13 comprises a journal 42 which projects laterally in relation to said traveler and which penetrates into an oblong slot 43 of the connecting rod 15.

As can be seen from FIG. 3, the traveler 13 is also traversed vertically by a recess 44 delimited at the front by a cam surface 45 forming a slope inclined forward and downward.

As can be seen on FIGS. 3 and 5, at the rear end of traveler 13 is mounted a hook element 46 which takes the form of a cut flat sheet and which pivots on the traveler 13 about a transverse horizontal axis 47. The hook element 46 lies in the hollow inner space 8 of the slide rail and is stressed upward by an elastic metal wire 48 forming a spring catch, in a first angular direction 49.

The hook element 46 extends rearward to a pointed free end 50 which has an upper cam edge 51 extending rearward and upward to a hook or tip 52 projecting upward.

In the rest position of traveler 13 as shown on FIG. 3, the tip 52 is level with the slot 36 in the web of mobile profiles 7.

Also an actuator finger 53 itself arranged in the inner hollow space of the slide rail is mounted pivoting on the hook element 46 about a transverse horizontal pivot axis 54.

This actuator finger is stressed in a second angular direction 55 opposite said first angular direction 49 by the spring 48 which also acts on the hook element 46.

As shown on FIG. 5, this result is obtained thanks to a hook branch 48*a* of spring 48 passing through a hole 56 of the actuator finger 53 and an arc-shaped opening 57 arranged in the hook element 46 and centred on the pivot axis 54. As the hook branch 48*a* of the spring is located at an intermediate level between axes 47 and 54, and the elastic force F applied by the hook branch 48*a* passes between these axes 47 and 54 (see FIG. 3), spring 48 stresses the hook element 46 and the actuator finger 53 respectively in opposite angular directions 49, 55. Also the arc shape of the slot 57 allows a certain angular clearance of the actuator finger 53 in relation to the hook element 46 without the hook branch 48*a* interfering with the hook element 46.

Also the actuator finger 53 comprises a stop 58 formed in particular by a stamping such as a semi-slot which projects from the side of the hook element 46 and which stops against the front edge of said hook element to limit the pivoting of the actuator finger 53 in relation to said hook element in the second angular direction 55, thus defining an active position of the actuator finger.

As we can see on FIG. 3, in this active position the actuator finger is arranged so as to interfere with the two rigid stops 59, 60 produced for example in the form of stampings arranged in the base 21 of the fixed profile 6 and projecting into the inner hollow space 8 of the slide rail. The stop 59 is in an intermediate position on the length of the fixed profile whereas the stop 60 is preferably towards the rear end of said fixed profile for reasons which will be explained below.

The device which has just been described functions as follows.

When a user of the seat wishes to adjust the longitudinal position of the seat, he raises the front end of the control bracket 9 which causes the unlocking of the two side rail latches 29 as explained above.

During adjustment of the longitudinal position of the seat by the user, if the actuator finger 53 meets the stop 59 on forward movement of the seat, this actuator finger retracts by pivoting to the rear in the first angular direction 49, and when the actuator finger 53 meets the stop 59 during the rearward movement of the seat, it retracts by pivoting in the second angular direction 55, driving with it the hook element 46.

Figure 6:
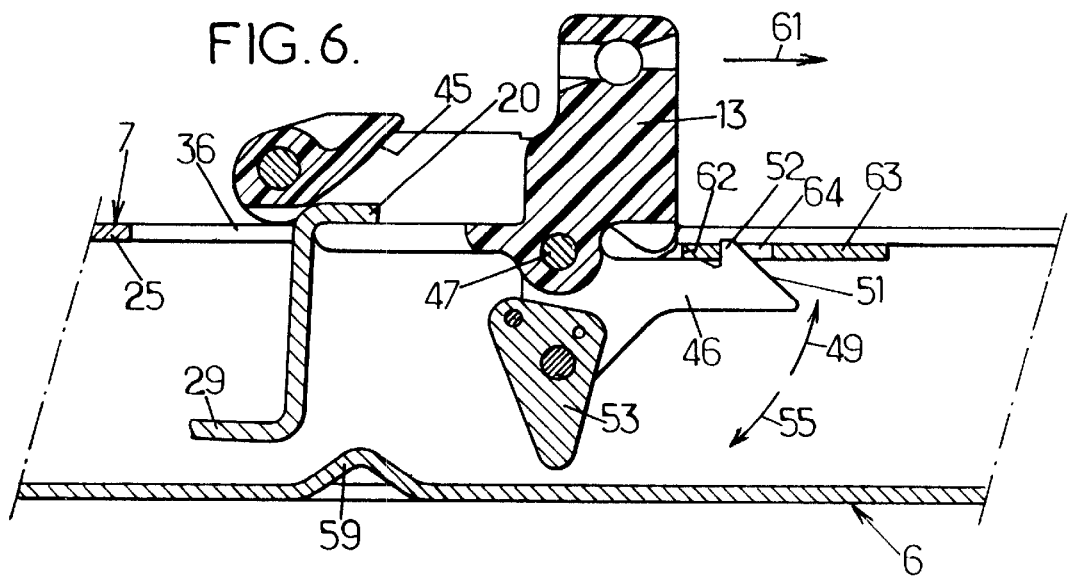
FIGS. 6 to 8 are views similar to FIG. 3, respectively while the seat is moved to the front with its seat back folded down to gain access to the rear seats (FIGS. 6 and 7) and on return of the seat towards the back with its seat back raised (FIG. 8).

Finally as shown on FIG. 6, to gain access to or leave the rear seats of the vehicle, folding the seat back forward creates a tension on cable 12 which causes the traveler 13 to slide towards the rear in the direction of arrow 61 unlocking the latches 29 of the two slide rails as explained above.

Furthermore while traveler 13 is sliding towards the rear, the hook element 46 pivots about its axis 47 in the second angular direction 55 by co-operation between the cam edge 51 and an edge 62 materializing the rear edge of cut-out 36 such that the tip 52 of the hook element passes below the upper web 25 of mobile profile 7 or, as in the example shown, below a metal plate 63 fixed below said upper web 25. The tip 52 of the hook element 46 then engages in a recess arranged in said plate 63 or where applicable directly in the upper web 25 of the mobile profile so as to then retain the traveler 13 in its rear or active position even when the tension exerted on the sheathed cable 12 is released, for example after the seat back has been raised.

Figure 7:
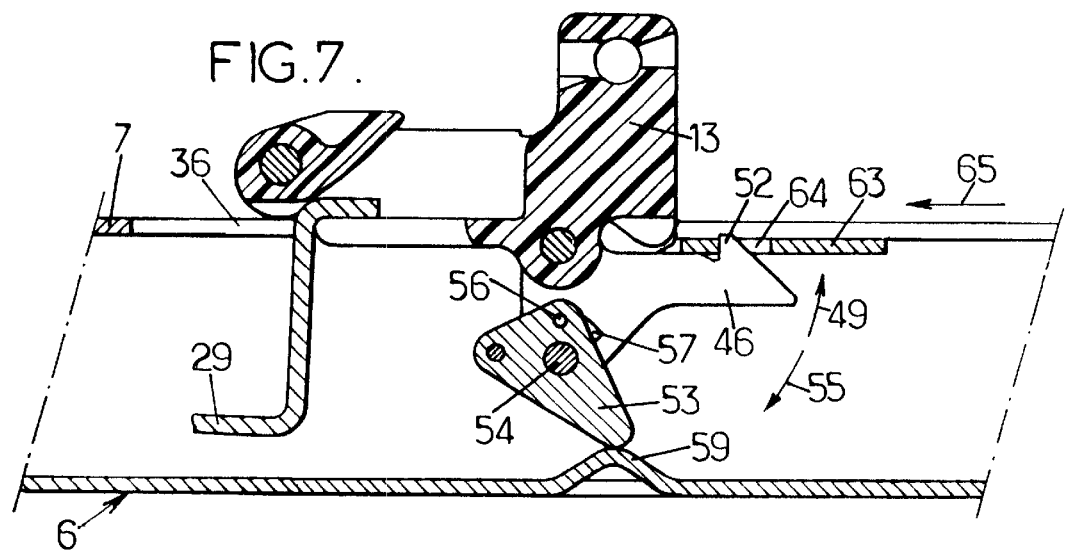

As shown on FIG. 7, when the user then slides the seat forward in the direction of arrow 65, the actuator finger 53 can elastically retract on its passage over the stop 59 by pivoting in the first angular direction 49 without the hook element 46 becoming unhooked from plate 63.

Figure 8:
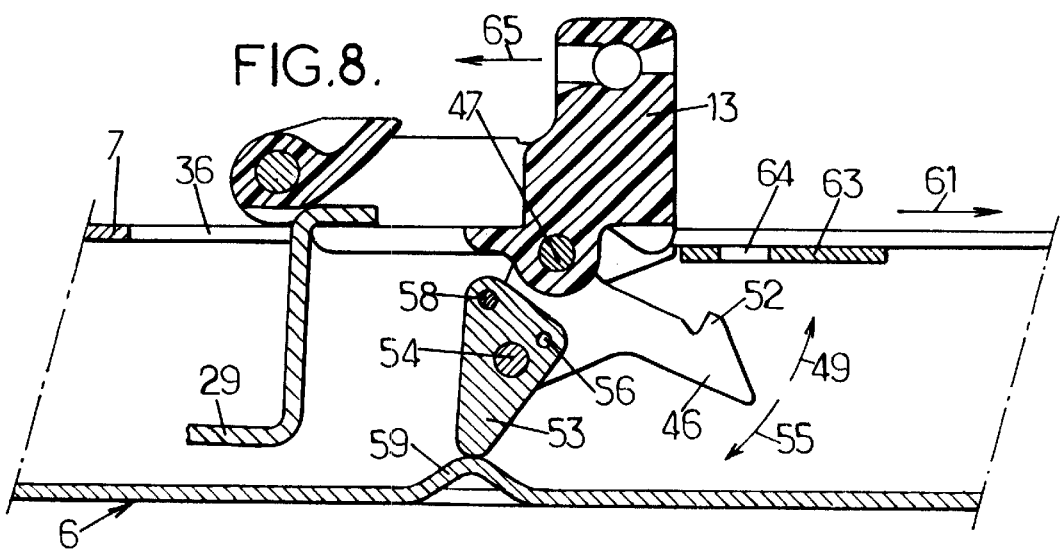

When the user then wishes to replace the seat in its normal usage position, he applies to the seat back a force oriented towards the rear which begins by straightening the seat back at least partly by releasing the tension exerted on the sheathed cable 12, then he slides the seat backward in the direction of arrow 61 as shown on FIG. 8. During the movement, the actuator finger 53 meets the stop 59 which stresses said actuator finger in the second angular direction 55. As the semi-slot 58 of the actuator finger has now stopped against the rear end of the hook element 46 preventing the relative pivoting of the actuator finger in relation to the hook element in the angular direction 55, it is the hook element 46 which pivots about its axis 47 in the angular direction 55 so that the tip 52 of said hook element is released from the recess 64, thus allowing the traveler 13 to move forward in the direction of arrow 65 under the action of spring 14 up to its rest position, which allows the latches 29 of the two slide rails to return to the locked position.

Thus after access to the rear seats of the vehicle, the seat is still in a predetermined position corresponding to the mean longitudinal setting of the seat base.

Finally it is noted that if the user holds the seat back folded forward during movement of the seat towards the back after access to the rear seats, the latches 29 of the slide rails do not return to the locked position during passage of the actuator finger 53 over stop 59. The same problem can occur if the user folds down the seat back without sliding the seat forward sufficiently for the actuator finger 53 to pass the stop 59.

But in these various cases the actuator finger 53 will interfere with the stop 60 when the seat slides backward to the rear stop position so that the tip 52 of the hook element 46 is then released from the recess 64 by pivoting of the finger 53 and the hook element 46 in the second angular direction 55. In this position when the user straightens the seat back, the traveler 13 returns to its rest position under the action of spring 14 due to the release of the tension exerted on cable 12, so that the latches 29 of the slide rails return to the locked position.

We claim:

1. Slide rail for vehicle seat comprising:

first and second profiles intended to be attached one to the vehicle and the other to the seat, the first and second profiles being mounted in sliding relation to one another in a longitudinal direction in opposite first and second sliding directions corresponding respectively to movements of the seat forwards and rearwards, a latch mounted on the second profile and moveable between firstly a locked position where the latch blocks the second profile in relation to the first profile, and secondly an unlocked position where said latch allows relative sliding between the first and second profiles, the latch being elastically biased towards its locked position, first control means for moving the latch from the locked position to the unlocked position without blocking said latch in the unlocked position in order to adjust the seat position, an unlocking device which is movable on the second profile between firstly a rest position where said unlocking device does not interfere with the latch and secondly an active position where said unlocking device places the latch in the unlocked position, the unlocking device being elastically biased towards the rest position and comprising retention means for holding said unlocking device in the active position when said unlocking device has been placed in said active position, and the unlocking device also comprising an actuator finger designed to co-operate with at least one stop attached to said first profile to release the unlocking device, enabling said unlocking device to return to the rest position when said unlocking device is in the active position and the first and second profiles move in relation to one another for the second sliding direction, and second control means for moving the unlocking device from the rest position to the active position, wherein the retention means of the unlocking device comprise a hook element pivotally mounted on said unlocking device about a first transverse axis perpendicular to the longitudinal direction, said hook element being elastically biased in a first angular direction toward an engagement position where said hook element is able to co-operate by hooking with a complementary element fixedly attached to the second profile when the unlocking device is in the active position, for retaining then said unlocking device in said active position, wherein said hook element is movable in a second angular direction opposite the first angular direction from the first engagement position to a retracted position where said hook element does not co-operate with the complementary element, wherein the actuator finger is born by the hook element and pivotally mounted on said hook element about a second transverse axis parallel to the first transverse axis, the actuator finger being elastically biased in the second angular direction toward an active position where said actuator finger is positioned to interfere with the stop of the first profile, the hook element co-operating with the actuator finger to allow only a pivoting of the actuator finger in the first angular direction from the active position of said actuator finger, wherein the first and second angular directions are selected so that the stop of the first profile biases the actuator finger in the second angular direction when said actuator finger is in the active position and meets said stop of the first profile while the first and second profiles move in relation to each other in the second sliding direction, the actuator finger then driving the hook element in the first angular direction up to its retracted position, wherein the stop of the first profile is designed to co-operate with the actuator finger by a cam effect by moving said actuator finger in the first angular direction from the active position in relation to the hook element when the actuator finger meets the stop of the first profile, being in the active position, while the first and second profiles move in relation to each other in the first sliding direction so that said actuator finger can then pass beyond the stop of the first profile.

2. Slide rail according to claim 1, in which the stop of the first profile is rigid.

3. Slide rail according to claim 2, in which the first profile has approximately a U-shaped cross-section with a horizontal web and two vertical side wings, the stop being constituted by a stamping arranged locally in the web of the first profile.

4. Slide rail according to claim 1, in which the unlocking device comprises a traveler which is slidingly mounted in the longitudinal direction on the second profile between positions corresponding to the rest and active positions of the unlocking device, the hook element being mounted pivoting on this traveler and said traveler co-operating by cam effect with a control finger linked to the latch to move said latch to its unlocked position when the unlocking device is in its active position.

5. Slide rail according to claim 4, in which the latch is an elastic metal part contained in an inner hollow space delimited by the first and second profiles, said latch comprising a folded free end forming said control finger.

6. Slide rail according to claim 4, in which the second profile has an approximately U-shaped cross-section with a horizontal web and two vertical side wings, the traveler being mounted on the web of the second profile outside the slide rail, said traveler being linked to the hook element through a longitudinal slot arranged in the web of the second profile, the hook element and actuator finger being situated in a hollow inner space delimited by the first and second profiles and being linked to the traveler through a horizontal slot arranged in the web of the second profile, said longitudinal slot being also traversed by the control finger of the latch.

7. Slide rail according to claim 6, in which the hook element comprises a free end with a hook which projects towards the web of the second profile and which is designed to penetrate into a recess belonging to said web of the second profile, said hook being in the slot of the web of the second profile when the unlocking device is in a rest position, and said free end of the hook element having an inclined cam surface designed to co-operate with the web of the second profile at one end of the slot of this web, repelling the hook element into its retracted position when the unlocking device is moved from its rest position to its active position.

8. Slide rail according to claim 1, in which the unlocking device comprises a spring with a hook branch which is linked to the actuator finger and which penetrates into an arc-shaped slot arranged in the hook element, said arc-shaped slot being centered on a second transverse axis and being arranged to allow the actuator finger to move in the first angular direction in relation to the hook element from the active position of said actuator finger, said hook branch exerting on the actuator finger and the hook element a force oriented along a line passing between the first and second transverse axes so as to bias the hook element in the first angular direction and the actuator finger in the second angular direction.

9. Vehicle seat comprising a seat base mounted sliding longitudinally by at least one slide rail according to claim 1.

10. Vehicle seat comprising a seat base slidingly mounted longitudinally by first and second slide rails, the first slide rail comprising:

first and second profiles intended to be attached one to the vehicle and the other to the seat, said first and second profiles of the first slide rail being mounted in sliding relation to one another in a longitudinal direction in opposite first and second sliding directions corresponding respectively to movements of the seat forwards and rearwards, a latch mounted on the second profile of the first slide rail and moveable between firstly a locked position where the latch blocks the second profile in relation to the first profile, and secondly an unlocked position where said latch allows relative sliding between the first and second profiles of the first slide rail, the latch being elastically biased towards its locked position, first control means for moving the latch from the locked position to the unlocked position without blocking said latch in the unlocked position in order to adjust the seat position, an unlocking device which is mounted mobile on the second profile of the first slide rail between firstly a rest position where said unlocking device does not interfere with the latch and secondly an active position where said unlocking device places the latch in the unlocked position, the unlocking device being elastically biased towards the rest position and comprising retention means for holding said unlocking device in the active position when said unlocking device has been placed in said active position, and the unlocking device also comprising an actuator finger designed to co-operate with at least one stop attached to said first profile to release the unlocking device, enabling said unlocking device to return to the rest position when said unlocking device is in the active position and the first and second profiles move in relation to one another for the second sliding direction, and second control means for moving the unlocking device from the rest position to the active position, wherein the retention means of the unlocking device comprise a hook element pivotally mounted on said unlocking device about a first transverse axis perpendicular to the longitudinal direction, said hook element being elastically biased in a first angular direction toward an engagement position where said hook element is able to co-operate by hooking with a complementary element fixedly attached to the second profile of the first slide rail when the unlocking device is in the active position, for retaining then said unlocking device in said active position, wherein said hook element is movable in a second angular direction opposite the first angular direction from its first engagement position to a retracted position where said hook element does not co-operate with the complementary element, wherein the actuator finger is born by the hook element and pivotally mounted on said hook element about a second transverse axis parallel to the first transverse axis, the actuator finger being elastically biased in the second angular direction toward an active position where said actuator finger is positioned to interfere with the stop of the first profile, the hook element co-operating with the actuator finger to allow only a pivoting of the actuator finger in the first angular direction from the active position of said actuator finger, wherein the first and second angular directions are selected so that the stop of the first profile biases the actuator finger in the second angular direction when said actuator finger is in the active position and meets said stop of the first profile while the first and second profiles move in relation to each other in the second sliding direction, the actuator finger then driving the hook element in the first angular direction up to its retracted position, wherein the stop of the first profile is designed to co-operate with the actuator finger by a cam effect by moving said actuator finger in the first angular direction from the active position in relation to the hook element when the actuator finger meets the stop of the first profile, being in the active position, while the first and second profiles move in relation to each other in the first sliding direction so that said actuator finger can then pass beyond the stop of the first profile, the second slide rail also comprising first and second profiles and a latch moveable between locked and unlocked positions, the seat base being fixed to the second profiles of the slide rails, the unlocking device of the first slide rail being linked by means of a connecting rod to a transverse link bar which is pivotally mounted on the second profiles of the two slide rails and which comprises a support flange co-operating with the latch of the second slide rail to move said latch of the second slide rail into its unlocked position on actuation of the second control means.

* * * * *